US011216025B2

(12) United States Patent
Tsau et al.

(10) Patent No.: US 11,216,025 B2
(45) Date of Patent: Jan. 4, 2022

(54) ADJUSTABLE FIXING ASSEMBLY

(71) Applicants:INVENTEC (PUDONG) TECHNOLOGY CORPORATION, Shanghai (CN); INVENTEC CORPORATION, Taipei (TW)

(72) Inventors: Shiang-Chun Tsau, Taipei (TW); Chen-Wei Huang, Taipei (TW); Chun-Ying Yang, Taipei (TW); Ying-Chao Peng, Taipei (TW); Hsiang-Yun Lu, Taipei (TW); Tai-Yi Chiang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 103 days.

(21) Appl. No.: 16/714,172

(22) Filed: Dec. 13, 2019

(65) Prior Publication Data
US 2020/0387191 A1 Dec. 10, 2020

(30) Foreign Application Priority Data

Jun. 6, 2019 (CN) .......................... 201910492974.9

(51) Int. Cl.
*F16B 5/00* (2006.01)
*G06F 1/16* (2006.01)
*F16B 5/02* (2006.01)
*H05K 5/02* (2006.01)

(52) U.S. Cl.
CPC ................. *G06F 1/16* (2013.01); *F16B 5/02* (2013.01); *H05K 5/02* (2013.01)

(58) Field of Classification Search
None
See application file for complete search history.

(56) References Cited

U.S. PATENT DOCUMENTS

| 9,207,709 | B2* | 12/2015 | Xie | G06F 1/187 |
| 9,652,001 | B2* | 5/2017 | Wang | G06F 1/187 |
| 10,546,616 | B2* | 1/2020 | Ku | G11B 33/124 |
| 2005/0066346 | A1* | 3/2005 | Wang | H05K 7/1489 |
| | | | | 720/657 |
| 2011/0005068 | A1* | 1/2011 | Zhang | G11B 33/124 |
| | | | | 29/729 |
| 2011/0234060 | A1* | 9/2011 | Wu | G11B 33/128 |
| | | | | 312/111 |

\* cited by examiner

*Primary Examiner* — Anthony Q Edwards
*Assistant Examiner* — Rashen E Morrison
(74) *Attorney, Agent, or Firm* — Maschoff Brennan (57) ABSTRACT

The disclosure provides an adjustable fixing assembly. The adjustable fixing assembly includes a base plate and a cover plate. The cover plate includes a plate portion and a protrusion portion protruding from the plate portion. The cover plate includes a first installation position and a second installation position. When the cover plate is in the first installation position, the protrusion portion extends away from the base plate, and the cover plate is spaced apart from the base plate by a first minimum distance. When the cover plate is in the second installation position, the protrusion portion extends towards the base plate, and the cover plate is spaced apart from the base plate by a second minimum distance, where the second minimum distance is smaller than the first minimum distance.

8 Claims, 7 Drawing Sheets

ADJUSTABLE FIXING ASSEMBLY

CROSS-REFERENCE TO RELATED APPLICATIONS

This non-provisional application claims priority under 35 U.S.C. § 119(a) on Patent Application No(s). 201910492974.9 filed in China on Jun. 6, 2019 the entire contents of which are hereby incorporated by reference.

BACKGROUND OF THE INVENTION

Technical Field of the Invention

The disclosure relates to a fixing assembly, more particularly to an adjustable fixing assembly.

Description of the Related Art

As technology progresses, a portable electronic product, such as a laptop computer, a mobile communication device, a portable audio device and so on, is widely used for enhancing efficiency in business and helping daily life.

To the electronic product, the electronic product has an in-built battery, and the in-built battery can be charged via a cable. For the laptop computer for instance, the in-built battery of the laptop computer can be charged via a cable, and the cable also connects with a transformer. In general, electricity of the in-built battery allows the user to use the laptop computer only for a certain time, such that the user may connects the cable and the transformer with the laptop computer to prevent the laptop computer from automatically turning off while the battery is depleted.

The laptop computer can be used not only in a stationary place (e.g., home or a restaurant), but also on a moving vehicle. On the moving vehicle, the laptop computer and the transformer may shake, thus the laptop computer and the transformer are important to be fixed.

SUMMARY OF THE INVENTION

One embodiment of the disclosure provides an adjustable fixing assembly. The adjustable fixing assembly includes a base plate and a cover plate. The cover plate includes a plate portion and a protrusion portion protruding from the plate portion. The cover plate includes a first installation position and a second installation position. When the cover plate is in the first installation position, the protrusion portion extends away from the base plate, and the cover plate is spaced apart from the base plate by a first minimum distance. When the cover plate is in the second installation position, the protrusion portion extends towards the base plate, and the cover plate is spaced apart from the base plate by a second minimum distance, where the second minimum distance is smaller than the first minimum distance.

Another embodiment of the disclosure provides an adjustable fixing assembly. The adjustable fixing assembly includes a base plate, a cover plate and at least one adjustable holder. The base plate has a plurality of pairs of positioning holes. The pairs of positioning holes are respectively spaced from an outer edge of the base plate by different distances. The cover plate is disposed on a side of the base plate and spaced apart from the base plate. The adjustable holder is located between the base plate and the cover plate and movably mounted on the base plate. The adjustable holder includes a holder body, a bolt and a nut. The holder body includes a pair of positioning pillars. The pair of the positioning pillar of the holder body are inserted into one of the pairs of the positioning holes. The bolt is disposed through the holder body, and the nut is tightened on the bolt so as to fix the bolt on the holder body.

BRIEF DESCRIPTION OF THE DRAWINGS

The present disclosure will become more fully understood from the detailed description given hereinbelow and the accompanying drawings which are given by way of illustration only and thus are not limitative to the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the following embodiments are disclosed by the figures, and some practical details are described in the following paragraphs, but the present disclosure is not limited thereto. Furthermore, for the purpose of illustration, some of the structures and components in the figures are simplified, and wires, reference lines or buses are omitted in some of the figures.

Moreover, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
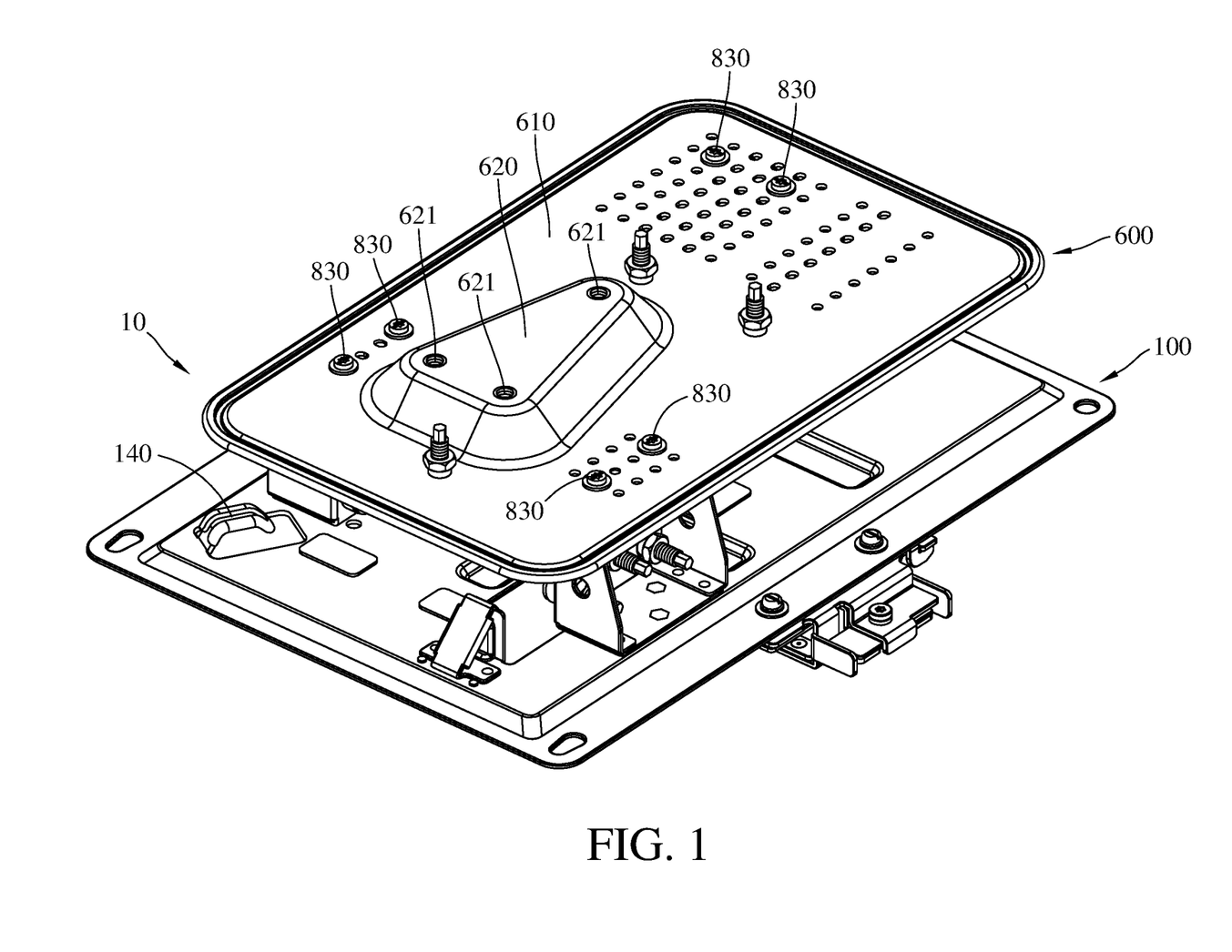
FIG. 1 is a perspective view of an adjustable fixing assembly according one embodiment of the disclosure.
Figure 2:
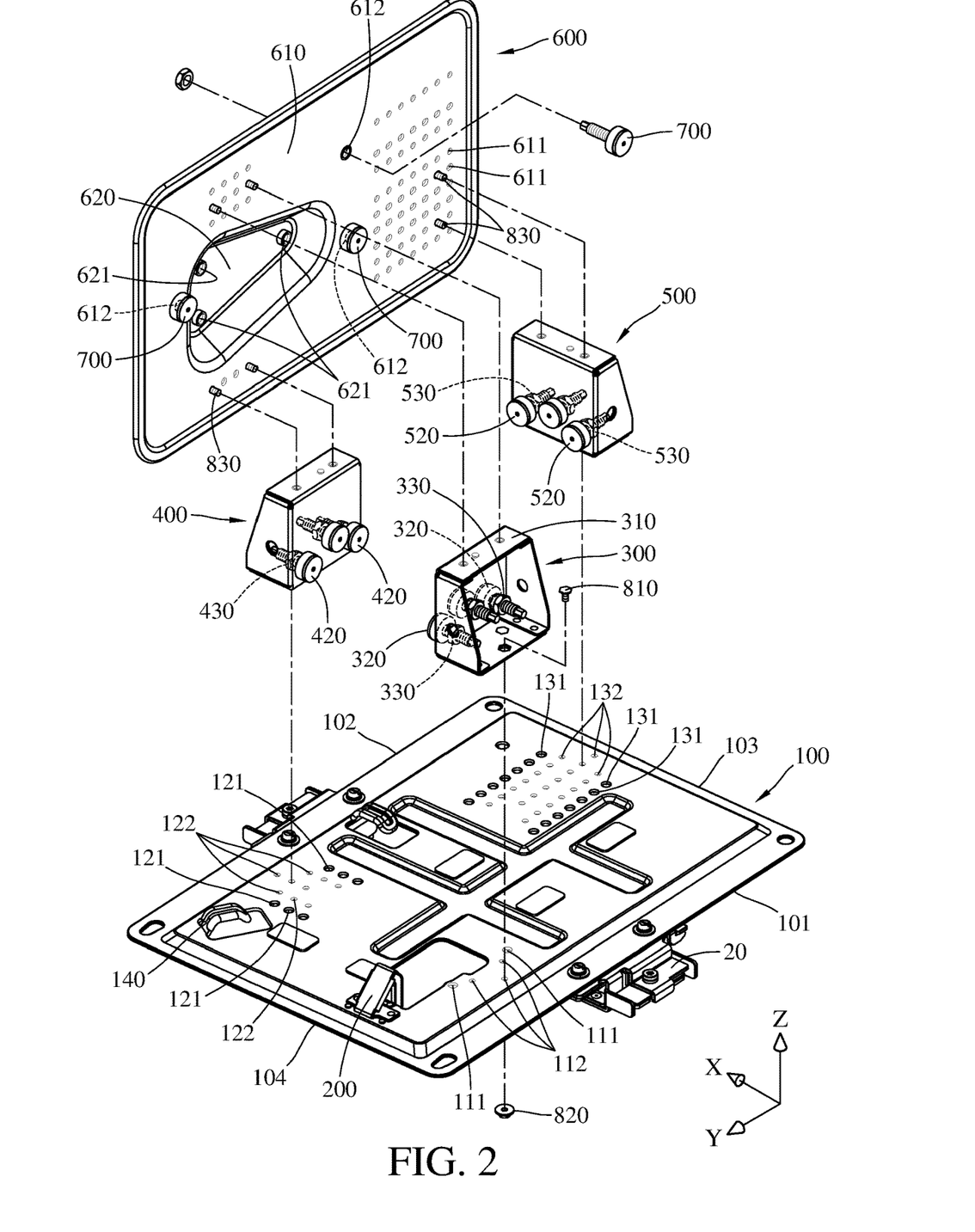
FIG. 2 is an exploded view of the adjustable fixing assembly in FIG. 1.

Referring to FIGS. 1 and 2, FIG. 1 is a perspective view of an adjustable fixing assembly 10 according one embodiment of the disclosure, and FIG. 2 is an exploded view of the adjustable fixing assembly 10 in FIG. 1.

In this embodiment, the adjustable fixing assembly 10 is configured to accommodate an electrical device (not shown), such as a transformer. The adjustable fixing assembly 10 includes a base plate 100, a plurality of fixed holders 200 and 300, a plurality of adjustable holders 400 and 500, a cover plate 600 and a plurality of fasteners 700.

The base plate 100 is, for example, a rectangular plate. The base plate 100 includes a first side 101, a second side 102 opposite to the first side 101, a third side 103, and a fourth side 104 opposite to the third side 103. In addition, the base plate 100 includes a pair of first positioning holes 111, a group of first insertion holes 112, multiple pairs of second positioning holes 121, multiple groups of second insertion holes 122, multiple pairs of third positioning holes 131, and multiple groups of third insertion holes 132. The pair of the first positioning holes 111 and the group of the first insertion holes 112 are located close to the first side 101 of the base plate 100. The pairs of the second positioning holes 121 and the groups of the second insertion holes 122 are located close to the second side 102 of the base plate 100. The pairs of the second positioning holes 121 are respectively spaced from the second side 102 of the base plate 100 by different distances. The groups of the second insertion holes 122 are respectively spaced from the second side 102 of the base plate 100 by different distances. The adjustable holder 400 can be selectively mounted to one of the pairs of second positioning holes 121 and one of the groups of second insertion holes 122, thus the position of the adjustable holder 400 with respect to the second side 102 of the base plate 100 can be adjusted. The pairs of the third positioning holes 131 and the groups of the third insertion holes 132 are located close to the third side 103 of the base plate 100. The pairs of the third positioning holes 131 are respectively spaced from the third side 103 of the base plate by different distances. The groups of the third insertion holes 132 are respectively spaced from the third side 103 of the base plate 100 by different distances. The adjustable holder 500 can be selectively mounted to one of the pairs of the third positioning holes 131 and one of the groups of the third insertion holes 132, thus the position of the adjustable holder 500 with respect to the third side 103 of the base plate 100 can be adjusted.

In addition, the base plate 100 further includes a cable arrangement structure 140. The cable arrangement structure 140 is configured to properly arranging a cable (not shown) connected to the electrical device.

The fixed holder 200 is located close to the fourth side 104 of the base plate 100. The fixed holder 200 is a bent metal piece.

The fixed holder 300 is located close to the first side 101 of the base plate 100. The fixed holder 300 includes a holder body 310, a plurality of bolts 320 and a plurality of nuts 330. The holder body 310 is fixed on the base plate 100. The bolts 320 are disposed through the holder body 310. The nuts 330 are tightened on the bolts 320 so as to fix the bolts 320 on the holder body 310.

The adjustable holder 400 is located close to the second side 102 of the base plate 100. The adjustable holder 400 includes a holder body 410, a plurality of bolts 420, and a plurality of nuts 430. The holder body 410 is movably mounted on the base plate 100, and the position of the holder body 410 with respect to the base plate 100 can be adjusted. The bolts 420 are disposed through the holder body 410. The nuts 430 are tightened on the bolts 420 so as to fix the bolts 420 on the holder body 410.

The adjustable holder 500 is located close to the third side 103 of the base plate 100. The adjustable holder 500 includes a holder body 510, a plurality of bolts 520 and a plurality of nuts 530. The holder body 510 is movably disposed on the base plate 100, and the position of the holder body 510 with respect to the base plate 100 can be adjusted. The bolts 520 are disposed through the holder body 510. The nuts 530 are tightened on the bolts 520 so as to fix the bolt 520 on the holder body 510.

The fixed holder 300 and the adjustable holders 400 and 500 may have similar features to be connected to the base plates 100, but the holes that they cooperate with decide their position on the base plate 100. Specifically, the fixed holder 300 is fixed with the first positioning holes 111 and the first insertion holes 112, the adjustable holder 400 can be fixed to one of the pairs of the second positioning holes 121 and one of the groups of the second insertion holes 122 so as to be positioned at the desired place, and the adjustable holder 500 is fixed to one of the pairs of the third positioning holes 131 and one of the groups of the third insertion holes 132 so as to be positioned at the desired place. Note that the configuration enables the position adjustment of the adjustable holders 400 and 500 may be similar, thus the following paragraphs merely describe the connection between the adjustable holder 500 and the base plate 100.

Figure 3:
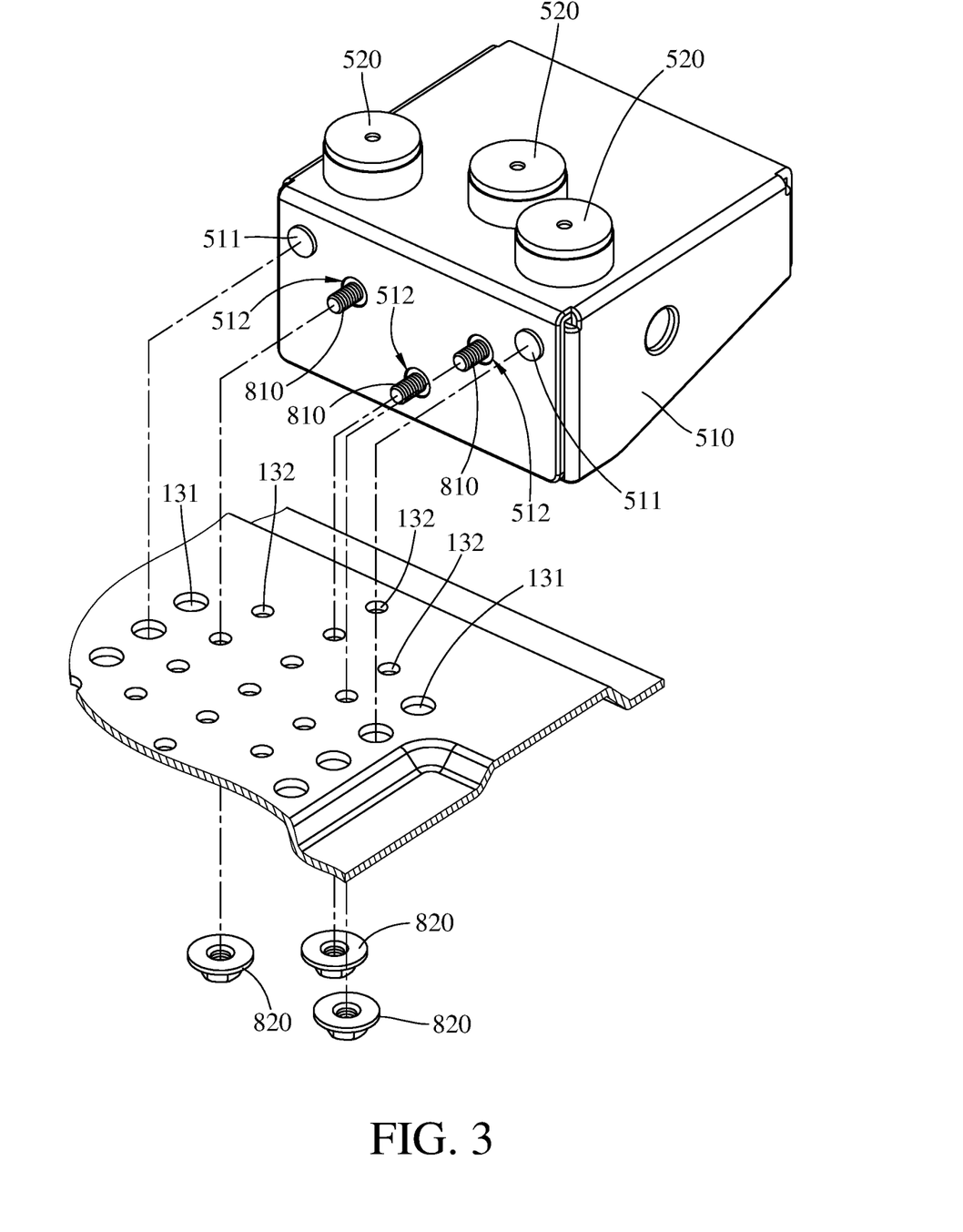
FIG. 3 is a partial exploded view of the adjustable fixing assembly in FIG. 2.

Referring to FIG. 3, FIG. 3 is a partial exploded view of the adjustable fixing assembly 10 in FIG. 2. The holder body 510 of the adjustable holder 500 includes a pair of positioning pillars 511 configured to be inserted into one of the pairs of third positioning holes 131. The insertion of the positioning pillars 511 may position the holder body 510 of the adjustable holder 500 on the base plate 100. In addition, the adjustable fixing assembly 10 further includes a plurality of bolts 810 and a plurality of nuts 820. The holder body 510 further includes a plurality of through holes 512. The bolts 810 are respectively disposed through the through holes 512 and the third insertion holes 132, and the nuts 820 are respectively tightened on the bolts 810, such that the adjustable holder 500 is fixed on the base plate 100.

As shown in FIG. 2, the cover plate 600 includes a plate portion 610 and a protrusion portion 620 protruding from the plate portion 610. The protrusion portion 620 of the cover plate 600 is formed by a stamping (also known as pressing) process. In this embodiment, the plate portion 610 includes a plurality of through holes 611. The plate portion 610 of the cover plate 600 can be placed on the fixed holder 300 and the adjustable holders 400 and 500. Screws 830 are respectively disposed through some of the through holes 611 corresponding to screw holes of the fixed holder 300 and the adjustable holders 400 and 500 and are screwed into the screw holes on the fixed holder 300 and the adjustable holders 400 and 500.

Figure 5:
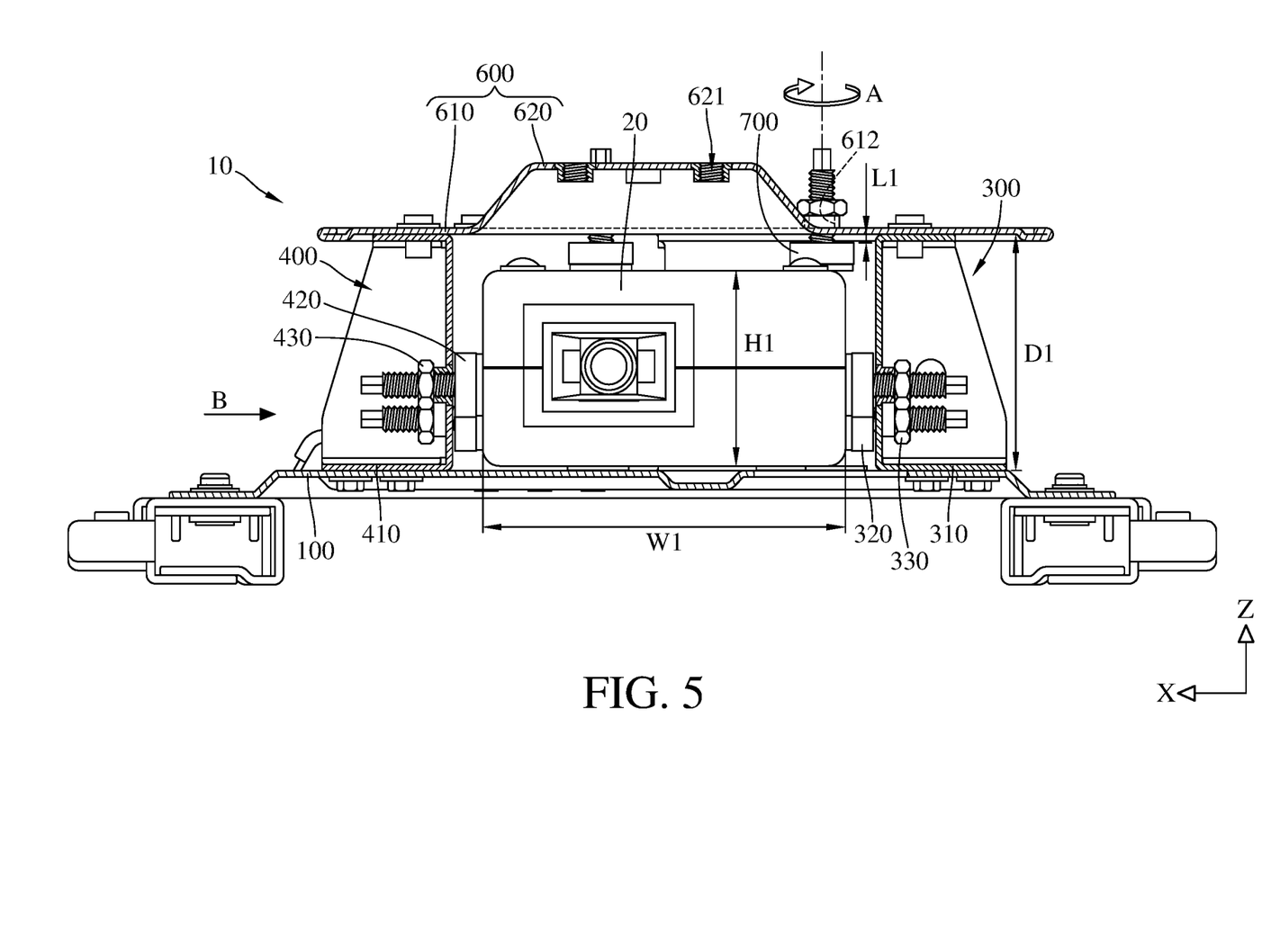
FIG. 5 is a cross-sectional view of the adjustable fixing assembly in FIG. 4.
Figure 7:
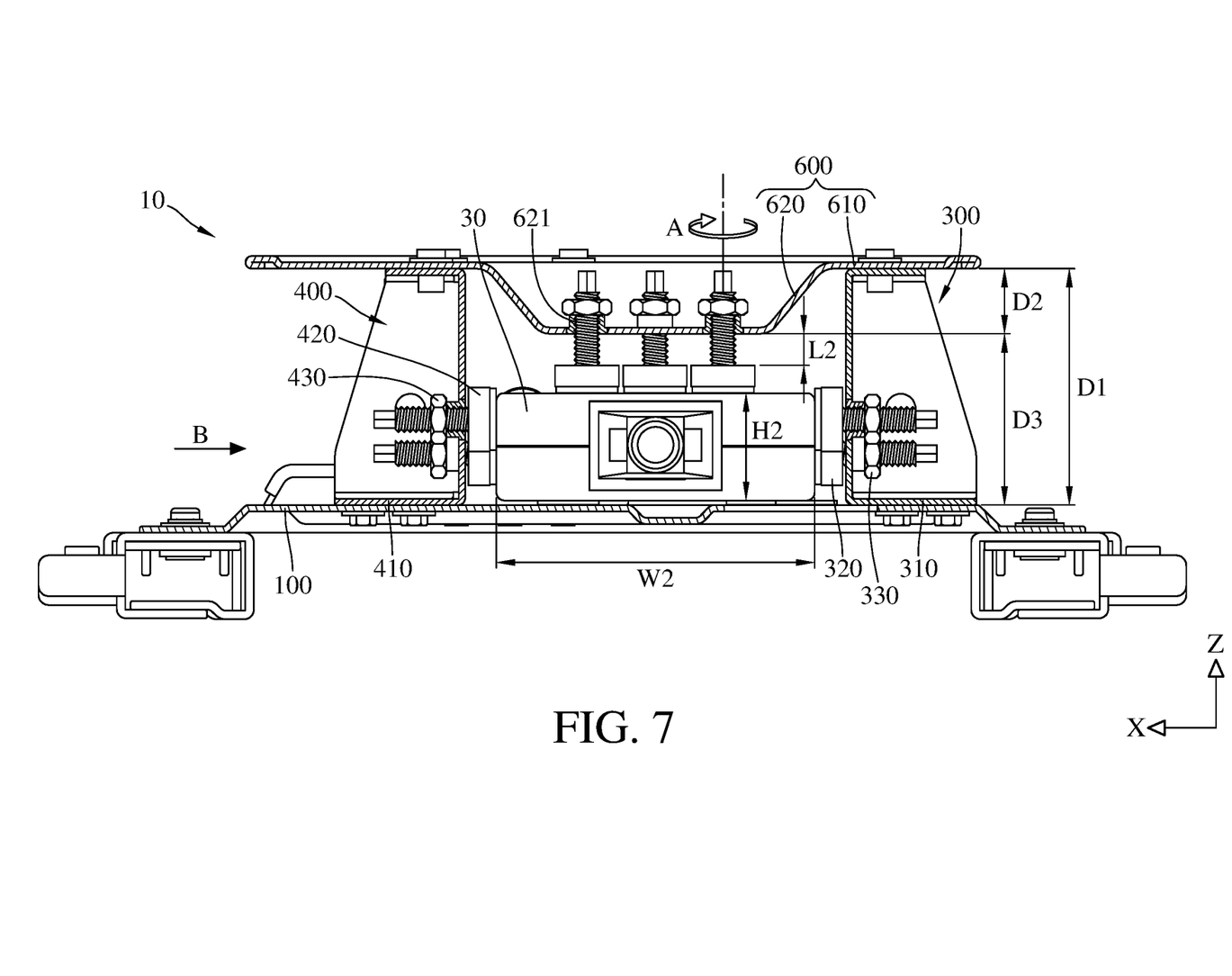
FIG. 7 is a cross-sectional view of the adjustable fixing assembly in FIG. 6.

There are two ways to install the cover plate 600 with respect to the base plate 100, one is shown in FIG. 5 (first installation position), and the other is shown in FIG. 7 (second installation position).

In this embodiment, the plate portion 610 includes a plurality of first screw holes 612, and the protrusion portion 620 includes a plurality of second screw holes 621. The fasteners 700 can be fixed to the first screw holes 612 of the plate portion 610 or the second screw holes 621 of the protrusion portion 620 depending on the position of the cover plate 600, wherein the selection of the position of the cover plate 600 may be decided based on the size of the electrical device. Also, to adapt to different sizes of electrical device, the positions of the adjustable holders 400 and 500 may also be changed accordingly.

Figure 4:
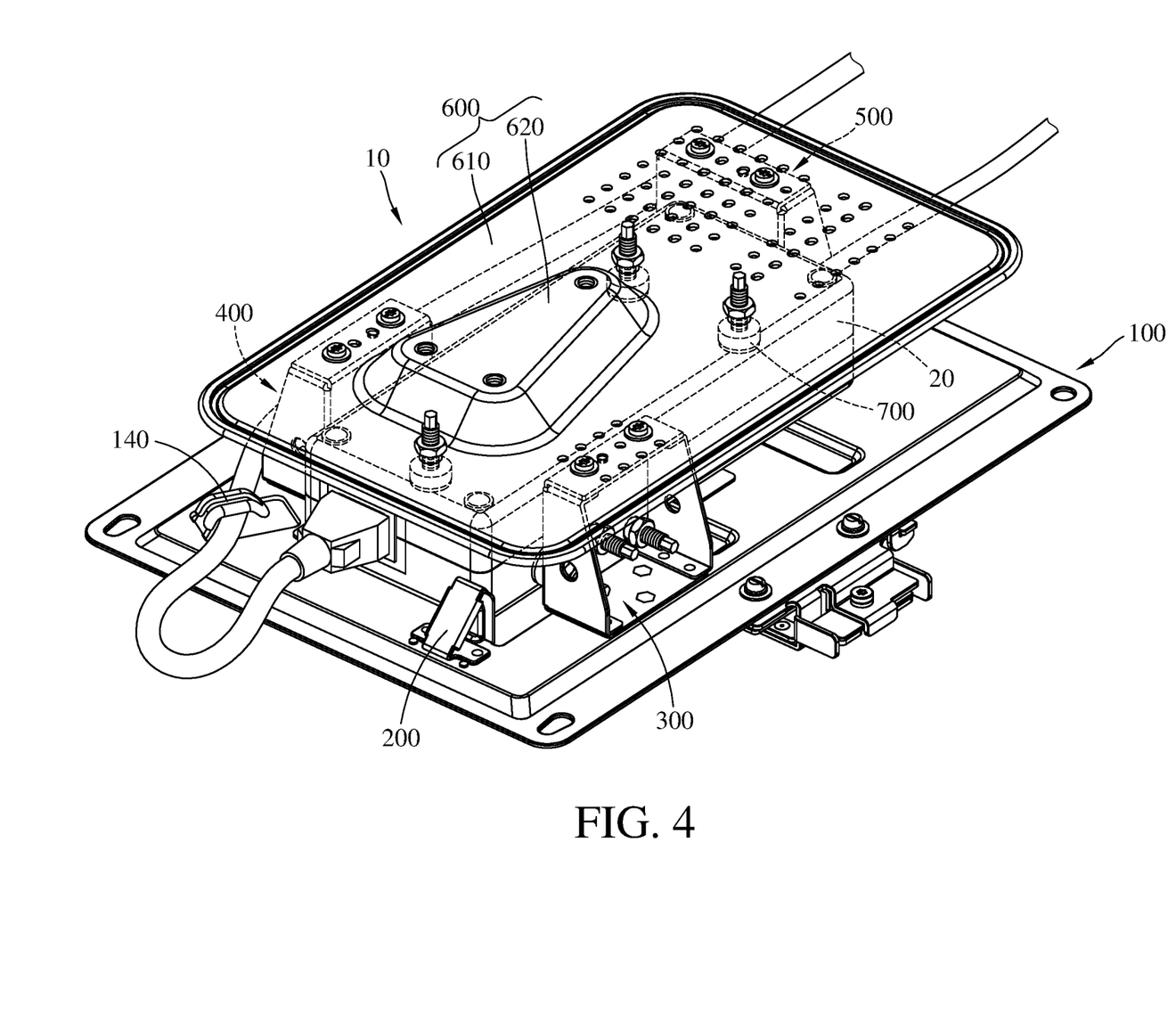
FIG. 4 is a perspective view of the adjustable fixing assembly in FIG. 1 when a large-sized transformer is mounted on the adjustable fixing assembly.

In specific, referring to FIGS. 4 to 5, FIG. 4 is a perspective view of the adjustable fixing assembly 10 in FIG. 1 when a large-sized transformer 20 is accommodated on the adjustable fixing assembly 10, FIG. 5 is a cross-sectional view of the adjustable fixing assembly 10 in FIG. 4.

Firstly, as shown in FIGS. 4 and 5, to accommodate a large-sized transformer 20, the cover plate 600 can be installed in the first installation position to spare a larger accommodation space between the cover plate 600 and the base plate 100 for the transformer 20. As such, the protrusion portion 620 is located opposite to the transformer 20 and does not interfere with the transformer 20. As shown, the transformer 20 has a height H1 which is close to but still smaller than the minimum distance D1 between the plate portion 610 of the cover plate 600 and the base plate 100. In addition, the fastener 700 can be rotated (e.g., along a direction A) to move a first distance L1 to contact a surface of the transformer 20 facing towards the cover plate 600. By doing so, although the transformer 20 may not in direct contact with the cover plate 600 in the first installation position, the fastener 700 can limit the movement of the transformer 20 towards or away from the cover plate 600. As shown, the movement of the transformer 20 in the Z-axis is limited.

Also, the adjustable holders 400 and 500 can be moved to hold the transformer 20. Take the operation of the adjustable holder 400 as an example, as shown, the holder body 410 of the adjustable holder 400 and/or the bolts 420 can be moved towards the transformer 20 along a direction B so as to make the distance between the adjustable holder 400 and the fixed holder 300 fit with the width W1 of the transformer 20. Specifically, the holder body 410 can be fixed to the desired second positioning holes 121 and the desired second insertion holes 122 to move the bolts 420 to the transformer 20 as close as possible, and the adjustments of the bolts 420 can eliminate the possible gap between the bolts 420 and the transformer 20. By doing so, the bolts 420 can press against the transformer 20, such that the transformer 20 can be clamped by the adjustable holder 400 and the fixed holder 300. As such, the transformer 20 is unable to move with respect to the fixed holder 300 and the adjustable holder 400. As shown, the movement of the transformer 20 in the X-axis is limited. Note that the 420 may contact the transformer 20 by merely switching the position of the holder body 410.

Similarly, the movement of the transformer 20 in the Y-axis can be limited by the cooperation of the adjustable holder 500 and the fixed holder 200, thus the same or similar descriptions will not be repeated.

On the other hand, the adjustable fixing assembly 10 is also capable of accommodating a small-sizes transformer. Please see FIGS. 6-7, to accommodate a small-sizes transformer 30, the cover plate 600 can be switched to the second installation position. By doing so, the accommodation space between the cover plate 600 and the base plate 100 becomes relatively small so that the available room is closer to the size of the transformer 30, and the adjustment of the fasteners 700 can eliminate the possible gap between the 620 and the transformer 30. As shown, the transformer 20 has a height H2 which is close to but still smaller than the minimum distance D3 between the protrusion portion 620 and the base plate 100, and the fasteners 700 can be rotated (e.g., along a direction A) to move a first distance L2 to contact a surface of the transformer 30 facing towards the 620, where the minimum distance D3 is substantially equivalent to the minimum distance D1 minus the height D2 of the protrusion portion 620 that is, after the cover plate 600 is the second installation position, the fasteners 700 can be moved to adjust the distance between the fasteners 700 and the base plate 100 to mate with the height H2 of the transformer 30, thereby limiting the movement of the transformer 20 in the Z-axis.

In this embodiment, since the cover plate 600 has the protrusion portion 620, such that the size of the available space between the cover plate 600 and the base plate 100 for an electrical device can be changed according to the size of the electrical device. As such, the adjustable fixing assembly 10 is suitable for accommodating different sizes of electrical devices.

In addition, the protrusion portion 620 of the cover plate 600 can define a room to be closer to the size of the electrical device to be accommodated in the adjustable fixing assembly 10, which may largely reduce the required adjustment distance of the fasteners 700, thereby reducing the time spent on adjusting the fasteners 700.

Figure 6:
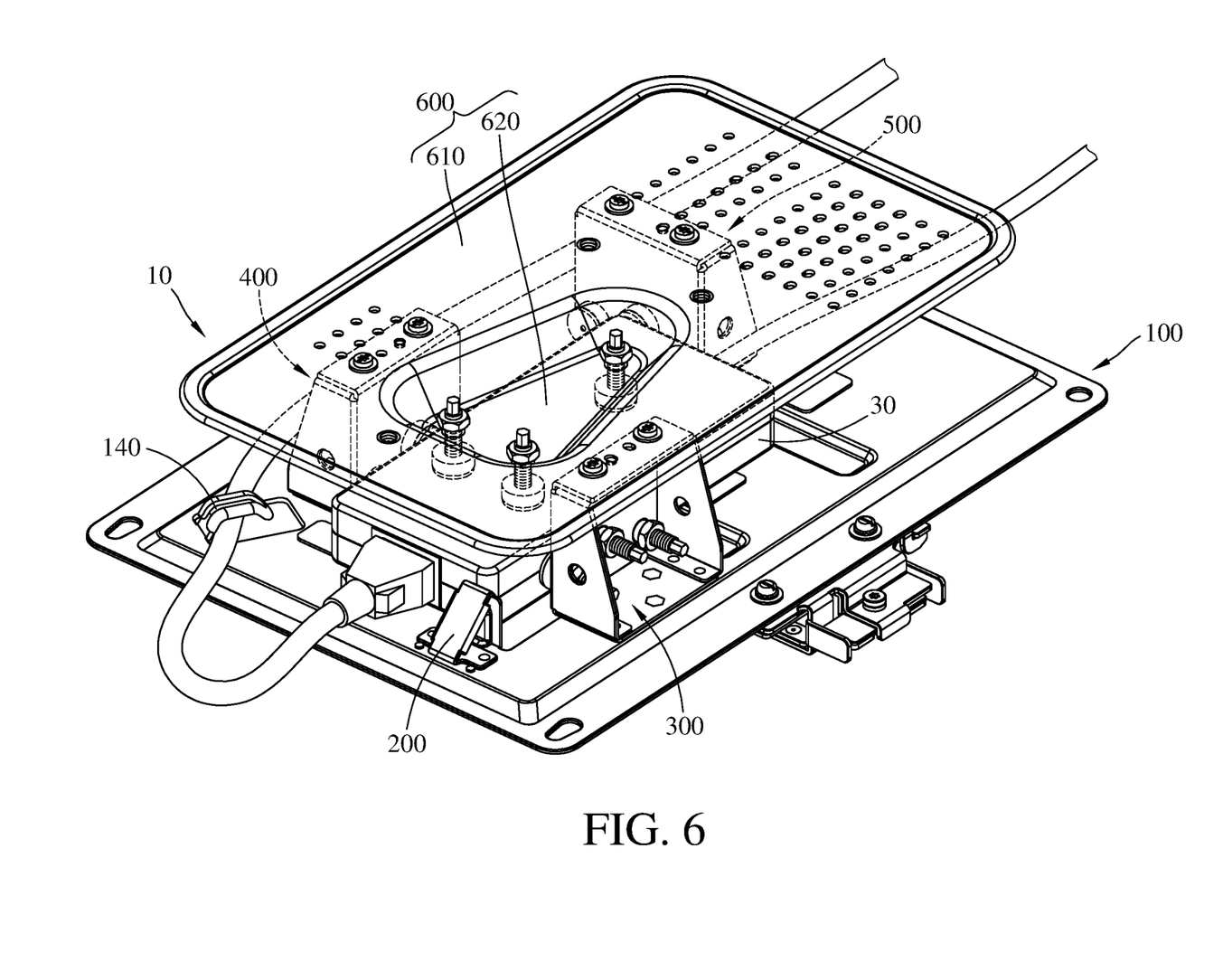
FIG. 6 is a perspective view of the adjustable fixing assembly in FIG. 1 when a small-sized transformer is mounted on the adjustable fixing assembly.

Specifically, as shown in FIGS. 6 and 7, for achieving to contact the transformers 30, the fasteners 700 are only required to be moved the second distance L2; however, if the fasteners 700 are mounted to the first screw holes 612 of the plate portion 610, the fasteners 700 are required to be moved a distance substantially equivalent to the second distance L2 plus the height D2 of the protrusion portion 620. Therefore, it is understood that the protrusion portion 620 of the cover plate 600 helps to shorten the adjustment distance of the fasteners 700 for contacting the transformer 30 as the cover plate 600 is in the second installation position and thus saving the time spending on adjusting the fasteners 700.

The positions of the adjustable holders 400 and 500 can be moved to hold the transformer 30. Take the operation of the adjustable holder 400 as an example, as shown, the holder body 410 of the adjustable holder 400 and/or the bolts 420 can be moved towards the transformer 30 along a direction B so as to make the distance between the adjustable holder 400 and the fixed holder 300 fit with the width W2 of the transformer 30. Specifically, the holder body 410 can be fixed to the desired second positioning holes 121 and the desired second insertion holes 122 to move the bolts 420 to the transformer 30 as close as possible, and the adjustments of the bolts 420 can eliminate the possible gap between the bolts 420 and the transformer 30. By doing so, the bolts 420 can press against the transformer 30, such that the transformer 30 can be clamped by the adjustable holder 400 and the fixed holder 300. As such, the transformer 30 is unable to move with respect to the fixed holder 300 and the adjustable holder 400. As shown, the movement of the transformer 30 in the X-axis is limited. Note that the bolts 420 may contact the transformer 30 by merely switching the position of the holder body 410.

Similarly, the movement of the transformer 30 in the Y-axis can be limited by the cooperation of the adjustable holder 500 and the fixed holder 200, and thus the same or similar descriptions will not be repeated.

In this embodiment, the adjustable fixing assembly 10 simultaneously includes the protrusion portion 620 of the cover plate 600 and the adjustable holders 400 and 500, but the present disclosure is not limited thereto; in some other embodiments, the adjustable fixing assembly may not include the adjustable holders 400 and 500, or may not include the protrusion portion 620 of the cover plate 600 and the adjustable holder 500. In addition, the adjustable fixing assembly 10 includes the fixed holders 200 and 300 and the adjustable holders 400 and 500, but the present disclosure is not limited thereto; in some other embodiments, all of the holders of the adjustable fixing assembly may be adjustable.

According to the adjustable fixing assemblies as discussed above, since the cover plate has the protrusion portion, such that the size of the available space between the cover plate and the base plate for an electrical device can be changed according to the size of the electrical device. As such, the adjustable fixing assembly is suitable for accommodating different sizes of electrical devices.

In addition, the protrusion portion of the cover plate can define a room to be closer to the size of the electrical device to be accommodated in the adjustable fixing assembly, which may largely reduce the required adjustment distance of the fasteners, thereby reducing the time spent on adjusting the fasteners.

Furthermore, the positioning pillars allows the adjustable holder to be firstly positioned at a position closest to the electrical device, and then the bolts can be moved with respect to the holder body of the adjustable holder to contact the electrical device, such that the adjustment distance of the bolts can be shortened and thus saving the time spending on adjusting the bolt.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. An adjustable fixing assembly, comprising:
    a base plate;
    a cover plate, comprising a plate portion and a protrusion portion protruding from the plate portion, wherein the cover plate comprises a first installation position and a second installation position; and
    at least one adjustable holder, wherein the adjustable holder is located between the base plate and the cover plate and is movably mounted on the base plate, the adjustable holder comprises a holder body, a bolt and a nut, the bolt is disposed through the holder body, and the nut is tightened on the bolt to fix the bolt on the holder body;
    when the cover plate is in the first installation position, the protrusion portion extends away from the base plate, and the cover plate is spaced apart from the base plate by a first minimum distance;
    when the cover plate is in the second installation position, the protrusion portion extends towards the base plate, and the cover plate is spaced apart from the base plate by a second minimum distance, wherein the second minimum distance is smaller than the first minimum distance.

2. The adjustable fixing assembly according to claim 1, further comprising at least one fastener, wherein the plate portion comprises at least one first screw hole, the protrusion portion comprise at least one second screw hole, the at least one fastener is fixed to the at least one first screw hole of the plate portion or the at least one second screw hole of the protrusion portion.

3. The adjustable fixing assembly according to claim 1, wherein the base plate comprises a plurality of pairs of positioning holes, the plurality of pairs of positioning holes are respectively spaced from an outer edge of the base plate by different distances, the holder body comprises a pair of positioning pillars, and the pair of positioning pillars of the holder body are inserted into one of the plurality of pairs of positioning holes.

4. The adjustable fixing assembly according to claim 1, further comprising a bolt and a nut, wherein the base plate comprises a plurality of insertion holes, the plurality of insertion holes are respectively spaced from an outer edge of the base plate by different distances, the holder body comprises a through hole, the bolt is disposed through one of the plurality of the insertion holes and the through hole, and the nut is tightened on the bolt.

5. The adjustable fixing assembly according to claim 1, wherein the quantity of the at least one adjustable holder is plural, the adjustable holders are respectively located at different sides of the base plate.

6. The adjustable fixing assembly according to claim 5, further comprising a plurality of fixed holders, wherein the plurality of fixed holders are located between the base plate and the cover plate and are fixed on the base plate, the adjustable holders and the plurality of fixed holders are respectively located at different sides of the base plate.

7. An adjustable fixing assembly, comprising:
    a base plate, having a plurality of pairs of positioning holes, wherein the plurality of pairs of positioning holes are respectively spaced from an outer edge of the base plate by different distances;
    a cover plate, disposed on a side of the base plate and spaced apart from the base plate; and
    at least one adjustable holder, located between the base plate and the cover plate and movably mounted on the base plate, wherein the adjustable holder comprises a holder body, a bolt and a nut, the holder body comprises a pair of positioning pillars, the pair of the positioning pillars of the holder body are inserted into one of the plurality of pairs of the positioning holes, the bolt is disposed through the holder body, the nut is tightened on the bolt so as to fix the bolt on the holder body.

8. The adjustable fixing assembly according to claim 7, further comprising a bolt and a nut, wherein the base plate comprises a plurality of insertion holes, the plurality of insertion holes are respectively spaced from an outer edge of the base plate by different distances, the holder body comprises a through hole, the bolt is disposed through one of the plurality of the insertion holes and the through hole, and the nut is tightened on the bolt.

* * * * *